W. COWLES.
Apparatus for Placing Elastic Tubing upon Spindles.
No. 201,096. Patented March 12, 1878.
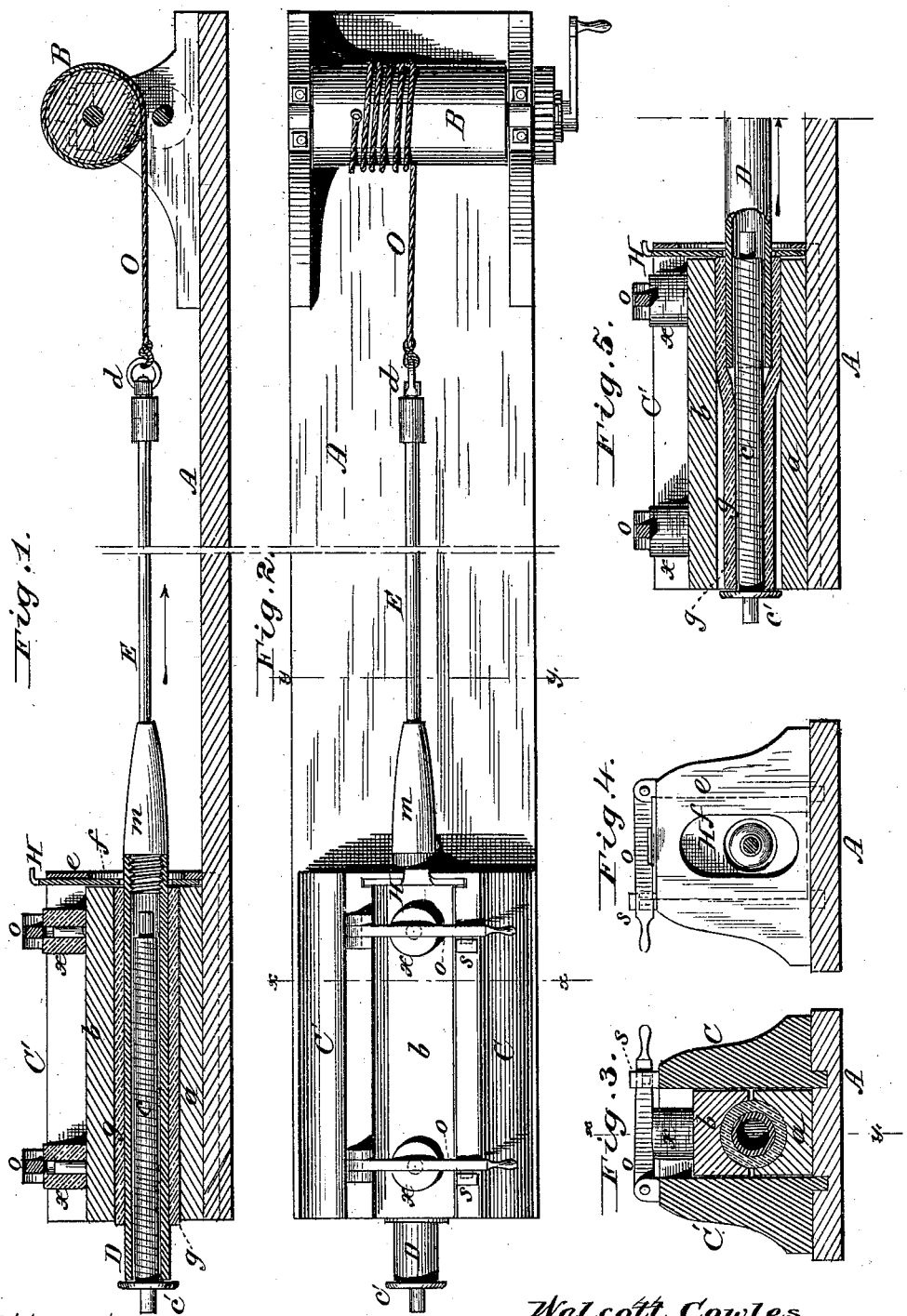

UNITED STATES PATENT OFFICE.

WALCOTT COWLES, OF SYRACUSE, NEW YORK, ASSIGNOR TO HIMSELF AND SAMUEL A. SEAGER, OF SAME PLACE.

IMPROVEMENT IN APPARATUS FOR PLACING ELASTIC TUBING UPON SPINDLES.

Specification forming part of Letters Patent No. 201,096, dated March 12, 1878; application filed November 14, 1877.

*To all whom it may concern:*

Be it known that I, WALCOTT COWLES, of the city of Syracuse, in the county of Onondaga and State of New York, have invented a new and useful Improved Apparatus for Placing Elastic Tubing upon Spindles or Shafts of Rolls for Wringers and other machinery, which I have fully described in the following specification, reference being had to the accompanying drawings, in which—

Figure 1 represents a longitudinal section, in which the mandrel is shown as having been drawn through the tube; Fig. 2, a top plan of the apparatus; Fig. 3, a transverse sectional view of the side-box head-pieces or holder on line $x\ x$, Fig. 2; Fig. 4, a section on line $y\ y$ of Fig. 2; and Fig. 5 shows the tube as being transferred from the mandrel to the roll or core.

The object of my invention is to furnish to the trade a device by which, in the manufacture of rolls for wringers or other machinery, the rubber or other elastic material or fabric, in a tubular form, can be easily placed upon and fitted to the spindle or shaft, and the cement remain evenly distributed, so that all parts of the rubber or material used shall be thoroughly cemented to and along the whole length and circumference of the spindle or shaft.

Another advantage of my invention is the ease, and consequently increased rapidity, with which the rubber or elastic material can be placed upon the spindle or shaft of the roll.

In the drawings, A represents the bed-piece. B is a windlass-roll geared at one end, and a crank-shaft and handle geared with the winding-roll, and the whole mounted, in any ordinary manner, upon one end of the bed-piece A. Upon the other end two side-box pieces, C C′, are mounted a suitable distance apart, with their inner faces perpendicular and parallel to each other, making a long narrow opening between them. In the bottom of this opening, extending the whole length, and fitting closely yet loosely therein, one half, $a$, of the holding-clamp, of wood or metal, having its upper surface for the whole length concaved lengthwise nearly to a semicircular shape, is placed with the concave groove upward. Immediately above this is the other half, $b$, of the holding-clamp, similarly shaped, and grooved concavely, but reversed in position, so that the two concave grooves will come together and leave a somewhat elliptically-shaped or nearly-circular hole running through between the pieces $a$ and $b$.

Upon the upper surface of the half $b$ two springs, $x\ x$, of rubber or other material, are mounted and fastened in any ordinary manner, and located as shown in the drawings.

Upon the top of the side-box piece C are two upright lugs or projections, $s\ s$, having on one side a notch; and upon the side-box piece C′ are two pressure-levers, $o\ o$, made of such size and shape as to slip under and catch into the notches in the lugs $s\ s$, or provided with a latch-shaped projection on one side to fit into the notches.

D represents a hollow tubular mandrel, the bore of which is large enough and deep enough to freely receive the whole of the shaft of the spindle $c$.

To the inner end of this mandrel a rod, E, is attached, having a swivel-eye, $d$, or its equivalent, upon one end, and a knob, $m$, upon the other, upon the front end of which a screw-thread is cut, fitting into a screw-thread cut in the rear end of the bore of the mandrel, and the two parts are screwed together, with their outer surfaces flush. The back end of the knob $m$ is tapered off down to the size of the rod E.

H represents a removable back-piece, fitting in slots or grooves cut perpendicularly in the inner surfaces of the side-box pieces C C′, closing up the entire rear part of the space between them, except a hole is cut therein large enough to allow the mandrel D to pass through.

O represents a cord with one end fastened to the winding-roll B and the other to the swivel-eye $d$ upon the rod E. The rear part of the opening between the side-box pieces C C′ may be closed by a rigidly-attached back, $e$, with an elliptical hole, $f$, therein, and in that case the back-piece H would fit inside of it, and adjusts itself with the mandrel to accommodate the increasing diameter of the tube, for it will be seen that, as the bed-piece $a$ cannot yield while drawing the mandrel into the tubing, the top part $b$ must yield to compensate for the expansion of the tubing, which causes a corresponding rising of the mandrel, and with it the self-adjusting head-stop H.

This device is operated as follows: Having loosened the levers $o\ o$ and taken out the upper half $b$ of the holding-clamp, a piece of tubing, $g$, of rubber or other elastic material or fabric, of the desired length, size, and bore, is placed in the concave groove of the lower half $a$ of the clamp. The upper half $b$ is replaced, the levers $o\ o$ brought over upon the springs and latched in the notches in the lugs $s\ s$. The small end of the rod E, having been uncoupled from the cord O, is then inserted in the front end of the bore of the elastic tubing $g$, as it is clamped between the pieces $a\ b$, pushed through far enough, so as to project beyond the back-piece H, and the cord is coupled on. The spindle $c$, having a washer, $c'$, on one end only, either wound with cord or covered with wood or other substance, or without any covering, as preferred, is then coated over with liquid cement, and inserted the whole length up to the washer into the hollow mandrel D, the washer being a little larger than the mandrel; then, by operating the crank, the cord O is wound upon the roll B, and the beveled face of the knob $m$ enters the bore of the tubing $g$, causing it to expand and allow the entrance of the mandrel D. While the mandrel is being drawn through, the back-piece H holds the back end of the tubing $g$ from sliding back, and the clamp $a\ b$ prevents any lateral or other motion, but the springs upon the upper half $b$ allow the tubing $g$ to be expanded.

When the outer end of the mandrel leaves the tubing, the latter strikes against the washer $c'$ on the end of the spindle, and, as the mandrel recedes, contracts upon the shaft of the spindle until, when the mandrel is completely withdrawn, the whole of the tubing is upon the spindle, as shown in Fig. 5. The clamp is then unlocked, the roll taken out, a washer put upon the other end of the shaft, and the roll is completed.

In preparing to operate I coat the outer surface of the mandrel and the inner one of the tubing with liquid cement, in order to allow the mandrel to slip through easier, and by lubricating it overcome most of the friction incident to its being drawn through the bore of the tubing, the mandrel being somewhat larger.

In making these rolls the bore of the elastic tubing used is always smaller than the shaft of the spindle, in order that it may be held thereon both by the elastic contraction and the cement.

By the method now generally in vogue the spindle is fastened by one end upright in a vise, coated with liquid cement, and then, by sheer muscular force, the elastic tubing is twisted and forced down upon the spindle, carrying with it most, if not all, of the cement. By my method the cement remains distributed over the whole surface of the spindle, and the tubing is thoroughly cemented to the spindle along its entire length.

It is not intended to claim a hollow mandrel having a tapering end as a means for transferring the rubber tubing upon the roll-spindle, as such device has been used as a hand device, and in which the rubber tubing is drawn over the fixed hollow mandrel, and the latter subsequently withdrawn.

Having thus described my method and apparatus, what I claim as my invention is—

1. An apparatus for placing elastic tubing upon rolls and spindles, consisting substantially of a hollow drawing-mandrel, upon which the tubing is drawn, and which holds the spindle or core, an abutting-stop for the tubing, a bed or box therefor, and a drawing power to withdraw the mandrel from the tubing and leave the latter upon the core.

2. In the above-described apparatus, the combination of the mandrel D, rod E, knob $\circ$, swivel-eye $d$, cord O, and winding-roll B with the elastic tubing $g$, back-piece H, and the spindle $c$, operated together to place the tubing upon the spindle, substantially as and for the purposes above specified.

3. In the above-described apparatus, the combination of the holding-clamp $a\ b$, having thereon the springs $x\ x$, the side-box pieces C C', the back-piece H, the notched lugs $s\ s$, and locking-levers $o\ o$ with the elastic tubing $g$, mandrel D, and spindle $c$, constructed and operating together substantially as and for the purposes above set forth.

4. The above-described self-adjusting device for holding the elastic tubing $g$, composed of the concave grooved parts $a\ b$, springs $x\ x$, locking-levers $o\ o$, and notched lugs $s\ s$, constructed and operating together substantially as above set forth.

5. The combination, with the drawing and transferring mandrel, its holding-box, and the tubing and stop H, of the end piece provided with slot $f$, to allow of the adjustment of the mandrel as it is drawn into and through the tubing.

6. In an apparatus for placing elastic tubing upon rolls, the combination, with the yielding holding-bed for said tubing, of the self-adjusting head-stop H and the drawing-mandrel, as described.

WALCOTT COWLES.

Witnesses:
C. W. SMITH,
N. B. SMITH.